(12) United States Patent
Kim et al.

(10) Patent No.: US 9,195,366 B2
(45) Date of Patent: Nov. 24, 2015

(54) OPERATIONAL PROGRAMS AND TOOLS SELECTION METHOD OF NUMERICAL CONTROL COMPOSITE MACHINE

(71) Applicant: DOOSAN INFRACORE CO., LTD., Incheon (KR)

(72) Inventors: Dong Hwan Kim, Gyeonggi-do (KR); Sung Hoon Cho, Gyeonggi-do (KR); Kyung Hoon Wie, Gyeonggi-do (KR); Hyung Jung Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 162 days.

(21) Appl. No.: 14/139,097

(22) Filed: Dec. 23, 2013

(65) Prior Publication Data

US 2014/0181752 A1  Jun. 26, 2014

(30) Foreign Application Priority Data

Dec. 26, 2012  (KR) .................. 10-2012-0153398

(51) Int. Cl.
*G06F 3/048* (2013.01)
*G06F 3/0481* (2013.01)
*G05B 19/18* (2006.01)
*G06F 3/0484* (2013.01)

(52) U.S. Cl.
CPC ............ *G06F 3/04817* (2013.01); *G05B 19/18* (2013.01); *G06F 3/04842* (2013.01); *G06F 2203/04803* (2013.01)

(58) Field of Classification Search
CPC .................................................. G06F 3/04817
USPC ........................................................ 715/785
See application file for complete search history.

(56) References Cited

U.S. PATENT DOCUMENTS

| 6,185,476 | B1 * | 2/2001 | Sakai ............................ 700/182 |
| 6,236,399 | B1 * | 5/2001 | Nishiyama et al. ........... 715/810 |
| 6,268,853 | B1 * | 7/2001 | Hoskins et al. ................. 700/83 |
| 6,546,297 | B1 * | 4/2003 | Gaston et al. ................... 700/83 |
| 8,195,310 | B2 * | 6/2012 | Ould et al. ....................... 700/18 |
| 2014/0189561 | A1 * | 7/2014 | Alldredge et al. ............ 715/771 |

* cited by examiner

*Primary Examiner* — William Titcomb
(74) *Attorney, Agent, or Firm* — John D. Veldhuis-Kroeze; Westman, Champlin & Koehler, P.A.

(57) ABSTRACT

The present disclosure relates to an operational program of a numerical control machine, which includes: a main menu in which main menus including a tool management menu and a tool setting menu are arranged; a detail information in which the list of tools mounted on a machine tool is outputted, when the tool management menu is selected from the main menu; a preview that displaying the machining state of a material on the basis of the information inputted through the main menu; and a function selection in which function selection icons for selecting and adding new tools are arranged, in which when the tool management tool is selected from the main menu, "register new tool item" is shown up on the function selection icons, and the function selection icon for selecting a new tool is selected, a tool database including characters, symbols, and images for tool lists is outputted in the detail information in accordance with a machining method so that a new tool can be registered.

12 Claims, 10 Drawing Sheets

OPERATIONAL PROGRAMS AND TOOLS SELECTION METHOD OF NUMERICAL CONTROL COMPOSITE MACHINE

CROSS-REFERENCE TO RELATED APPLICATIONS

This application is based on and claims priority from Korean Patent Application No. 10-2012-0153398, filed on Dec. 26, 2012, with the Korean Intellectual Property Office, the disclosure of which is incorporated herein in its entirety by reference.

FIELD OF THE DISCLOSURE

The present disclosure relates to an operational program and a tool selection method of a numerical control machine, and more particularly to an operational program and a tool selection method of a numerical control machine which manage tools, using a database in an operational program controlling a numerical control machine, and allows presentation of process management, tool selection, and cutting conditions etc.

BACKGROUND OF THE DISCLOSURE

Numerical control machine a material in a desired shape in accordance with the programs in an operational program. Because it is required to program process management, tool selection, and cutting conditions etc. and input them into the program, it may be a complicated and difficult process.

Accordingly, with the coming of an age requiring convenience for users, it is increasingly required to allow workers to simply input the shapes of objects and the machining conditions at the places where a numerical control machine is installed, without the procedure of complicated programming.

Automatic programming tools that make it possible to simply perform the procedure of complicate programming have been known in the art.

The automatic programming tools well known in the art focus on the information inputted by a user and the function of creating an NC program and allow a user to input only extremely limited information on the shapes of some tools by defining them in order to create tool paths for tools. In the automatic programming tools of the related art, the tool information is limited and not efficiently managed.

Cutting conditions for machining may depend on the types of processes and the types of materials and tools, but for the automatic programming tools of the related art, users manually input cutting conditions in person on the basis of their experiences and the manually inputted information is not systematically managed.

That is, the automatic programming tools of the related art cannot manage the information except the material information or tool shapes to be considered when selecting tools and depend on users' experiences.

Therefore, there is a demand for an operational program and a tool selection method of a numerical control machine compositionally equipped with very important information for cutting with a numerical control machine, for example, definition of the shape to be machined, machining simulation, creation of an NC program, a tool management function, a tool recommendation function, and a cutting condition recommendation function.

SUMMARY

The present disclosure has been made in an effort to provide an operational program and a tool selection method of a numerical control machine which allow a worker to create programs through an interactive program and make it possible to more easily and efficiently manage tools, using a tool database.

The present disclosure also provides an operational program and a tool selection method of a numerical control machine which allows a user to automatically select tools suitable for machining processes and materials to use, and make it possible to recommend a user cutting conditions, using the corresponding tools and the material information.

The technical subject to implement in the present disclosure are not limited to the technical problems described above and other technical subjects that are not stated herein will be clearly understood by those skilled in the art from the following description.

An exemplary embodiment of the present disclosure provides an operational program of a numerical control machine which includes: a main menu area 10 in which main menus including a tool management menu 11 and a tool setting menu 12 are arranged; a sub-menu area 20 in which a sub-menu of a specific main menu is arranged in a tab title, when the specific main menu is selected from the main menu area 10; a detail information area 30 in which detail information of a specific sub-menu is arranged, when the specific sub-menu is selected from the sub-menu area 20; a preview area 40 that displaying the machining state of a material on the basis of the information inputted through the main menu area 10; and a function selection area 50 in which a function selection icons 51 are arranged to perform an additional function, when the specific main menu or the specific sub-menu is selected, in which when the tool management tool 11 is selected from the main menu area 10, an icon of "register new tool item" for registering a new tool is shown up on the function selection area 50, and when the icon of the "register new tool item" for registering a new tool is selected, a tool database 52 including characters, symbols, and images for tool lists is outputted in the detail information area 30 in accordance with a machining method so that a new tool can be registered.

When a specific tool is selected from the tool database 52, a tool information area 54 and a basic tool image area 55 may be outputted in the detail information area 30, parameter values of the tool may be inputted from the tool information area 54, and an image of the tool may be displayed in the basic tool image area 55.

When a specific tool is selected from the tool database 52, a tool information area 54 and a basic tool image area 55 may be outputted in the detail information area 30, cutting information on the tool to be newly registered may be inputted in the tool information area 54, and an image of the tool may be displayed in the basic tool image area 55.

When the tool setting menu 12 is selected from the main menu area 10, an area where process parameter values can be inputted, a tool information presentation area 123, and an illustration area 124 may be displayed in the detail information area 30, and when the process parameter values are inputted, a tool suitable for the values may be recommended in the tool information presentation area 123 and the image of the tool may be outputted in the illustration area 124.

When a plurality of tools is to be recommended, the list of tools may be outputted and a desired tool is selected.

When the process parameter values are inputted, a machining process suitable for the illustration area 124 may be outputted as an associated image.

Another exemplary embodiment of the present disclosure provides a tool selection method of a numerical machine, which includes: receiving basic information such as the quality of a material to be machined; selecting a process for machining; receiving the shape to be machined and numerical information; displaying a tool suitable for the selected process and receiving a specific tool selected by a user; examining suitability of the tool for the material to be machined; receiving a machining method of any one of general turning, grooving, center hole drilling, and threading selected by a user; and displaying a tool suitable for the machining method selected by a user, using the shape to be machined and the numerical information.

When a machining for the general turning is selected, a tool that does not interfere with inner diameter machining in inner diameter machining is recommended, and when it is not inner diameter machining, tools suitable for a rough process and a finish process may be sequentially shown to a user.

Suitability of a tool for the material to be machined may be examined by filtering tools suitable for the material to be used and showing the tools to a user on the basis of recommended tool information according to the quality of a material to be machined, which is stored in a memory of a machine tool.

The displaying of a tool suitable for grooving may include displaying a tool suitable for the grooving method on the basis of any one selected from the information on a groove depth, a groove width, and the radius of a workpiece inputted by a user in the machining of shape.

The displaying of a tool suitable for center hole drilling may include displaying a tool suitable for the center hole drilling method on the basis of any one selected from the information on a hole depth, a hole diameter, a hole depth, a pitch, a threaded shape, and the radius of a workpiece inputted by a user in the machining of shape.

The details of other exemplary embodiments are included in the following detailed description and the accompanying drawings.

The operational program of a numerical control machine according to the present disclosure having the configuration described above includes a function capable of automatically generating an NC program on the basis of data inputted as an interactive program and can efficiently manage tools, using the tool database, and the system can recommend the optimum tool selection and cutting conditions, using the tool information on the basis of the management.

Accordingly, since the system provides optimum recommended values, a user who has insufficient expert knowledge and experiences can make selection of a tool and selection of cutting conditions, which have depended on the users' experiences, so the user can achieve good results.

The operational program of a numerical control machine according to the present disclosure can considerably contribute to increasing improving work efficiency and to reliability in machining in addition to convenience for a user.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative exemplary embodiments described in the detailed description, drawing, and claims are not meant to be limiting. Other exemplary embodiments may be utilized, and other changes may be made, without departing from the spirit or scope of the subject matter presented here.

The advantages and features of the present disclosure, and methods of achieving them will be clear by referring to the exemplary embodiments that will be describe hereafter in detail with reference to the accompanying drawings.

Like reference numerals indicate the same components throughout the specification.

The terms described hereafter are terms defined in consideration of the functions in the present disclosure and may be change in accordance with the manufacturers' intention and a custom, so the definition should be based on the entire description of the present disclosure.

An operational program and a tool selection method of a numerical control machine according to an exemplary embodiment of the present disclosure include largely two main functions.

The first one is a tool management function and an interface using a tool database.

The second one is an automatic tool recommendation function according to the shape and material of a workpiece and a process, using the tool database and an automatic cutting condition recommendation function according to the recommended tool information and the material of a workpiece, and a machining process.

The operational program may be provided in various ways. A local controller, a remote computer, a portable terminal, and a portable storage can be exemplified.

The local controller is disposed at one side of a numerical control machine and makes a numerical control machine be controlled at the place where the numerical control machine is installed.

The remote computer controls a numerical control machine at a remote place through wire/wireless communication.

The portable terminal may be, for example, a tablet PC, a smartphone, or a notebook.

The portable storage may be a USB memory, a memory card, and an external hard disk, and a diskette.

That is, they can be selected by users for their convenience, and they can enable users to program, using a computer at their offices and can provide the programming data in various types to a numerical control machine.

The operational program and the tool selection method of a numerical control machine according to an exemplary embodiment of the present disclosure are described hereafter with reference to FIGS. 1 to 7.

FIGS. 1 to 7 are diagrams illustrating an operational program and a tool selection method of a numerical control machine according to an exemplary embodiment of the present disclosure.

Figure 1:
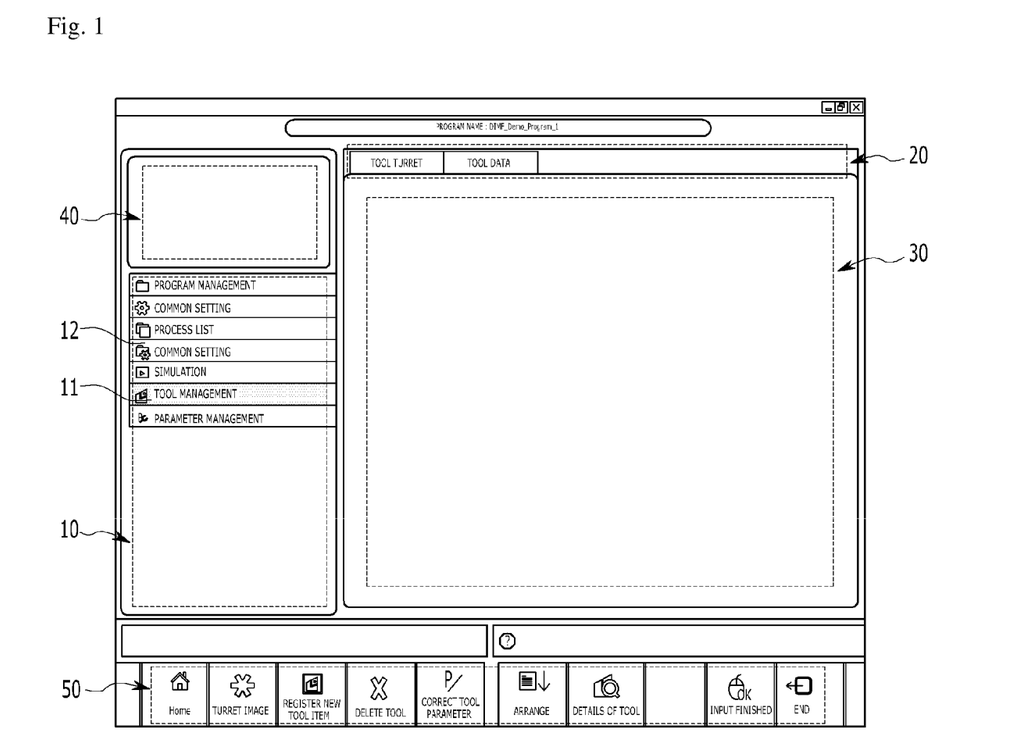
FIGS. 1 to 7 are diagrams illustrating an operational program and a tool selection method of a numerical control machine according to an exemplary embodiment of the present disclosure.

As illustrated in FIG. 1, the operational program may be displayed as an image on a display. The display may be a monitor, the display of a portable terminal, or the display of a controller.

That is, the image in FIG. 1, one example, can be changed in accordance with the size and the aspect ratio of the terminal.

The image displayed by the operational program according to an exemplary embodiment of the present disclosure includes a main menu area 10, a sub-menu area 20, a detail information area 30, a preview area 40, and a function selection area 50.

The main menu area 10 includes program management, common setting, a process list, process setting 12, simulation, tool management 11, and parameter management.

When any one main menu in the main menu area 10 is selected, the corresponding sub-menu is displayed in a tab title in the sub-menu area 20.

When any one sub-menu in the sub-menu area 20 is selected, the corresponding detail information is displayed in the detail information area 30.

Information such as a desired shape to be machined and simulation of the machining is displayed in the preview menu 40.

A plurality of selection icons 51 for selecting or performing additional functions is disposed in the function selection area 50.

An example of performing the first function of the operational program and the tool selection method of a numerical control machine according to an exemplary embodiment of the present disclosure is described first with reference to FIGS. 2 to 6. The first function is a tool management function and an interface using a tool database.

Figure 2:
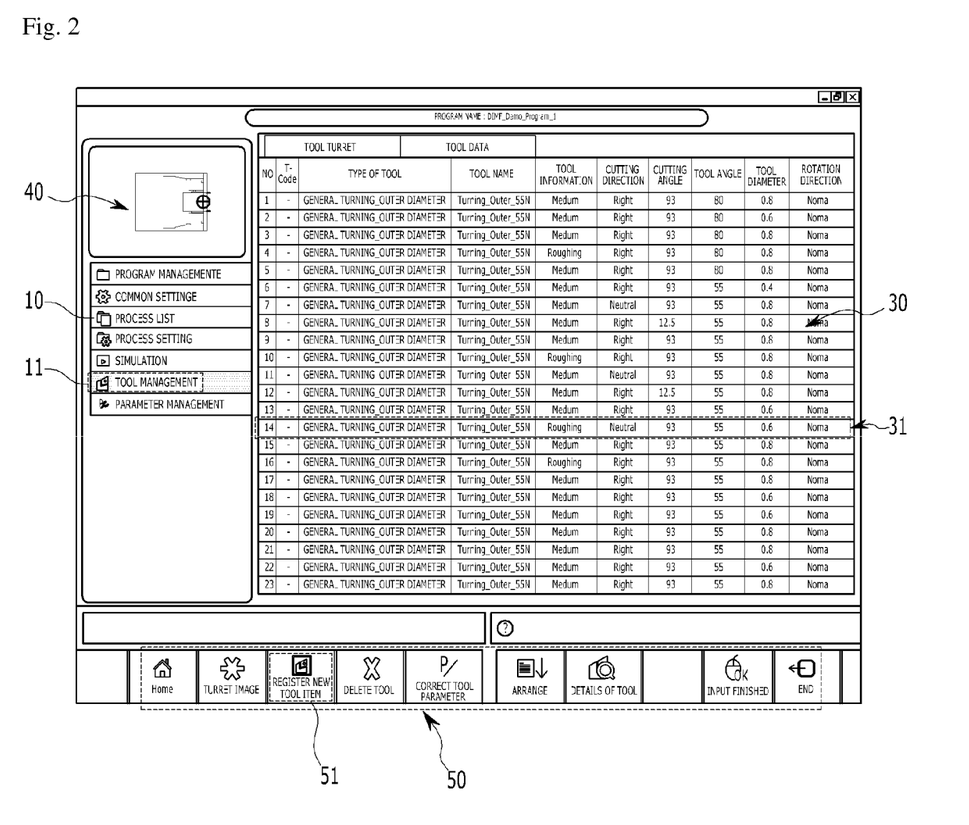

As illustrated in FIG. 2, when the tool management menu 11 is selected from the main menu area 10, the functions relating to tool management are shown up in the sub-menu area 20 and the function selection area 50.

Tab titles relating to tool management are shown up in the sub-menu area 20. For example, the tab title shown up may be a tool data.

A tool database loaded in advance is outputted on the detail information area 30.

Figure 3:
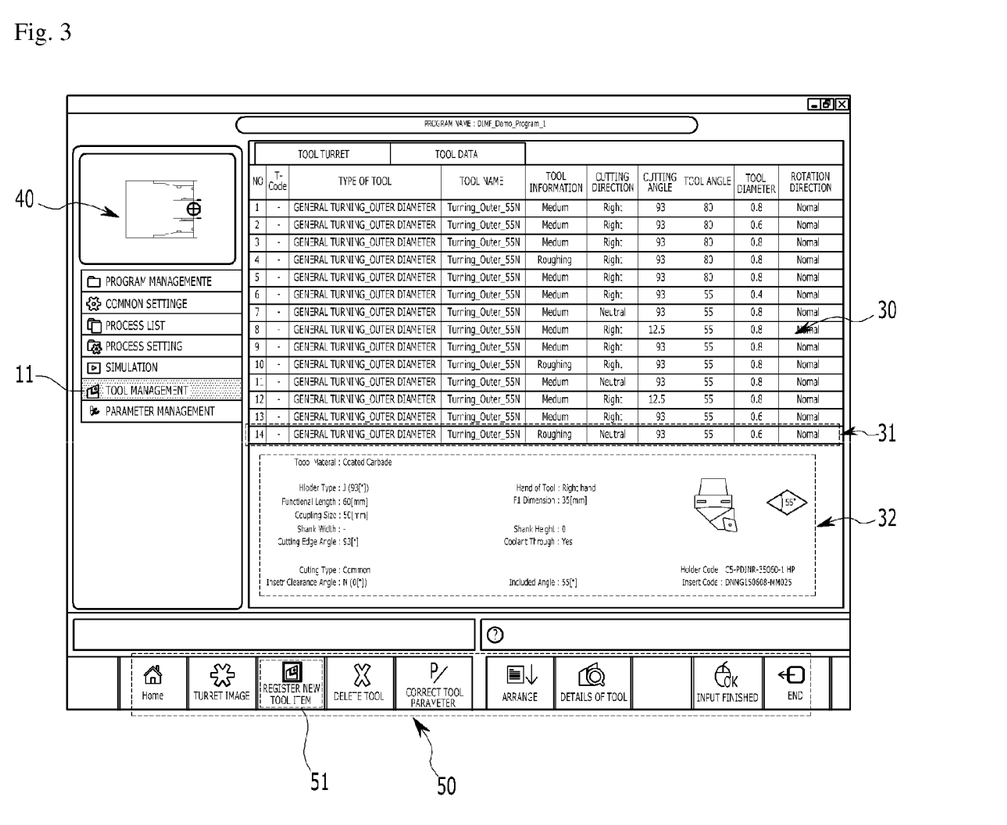

As illustrated in FIG. 3, when a specific record data 31 is selected, detailed additional information on the record data 31 is outputted on the additional information area 32.

That is, detailed information is displayed to enable a user to intuitionally know which specification the current selected tool has, which function the tool performs, and which shape a cutting insert has.

Figure 4:
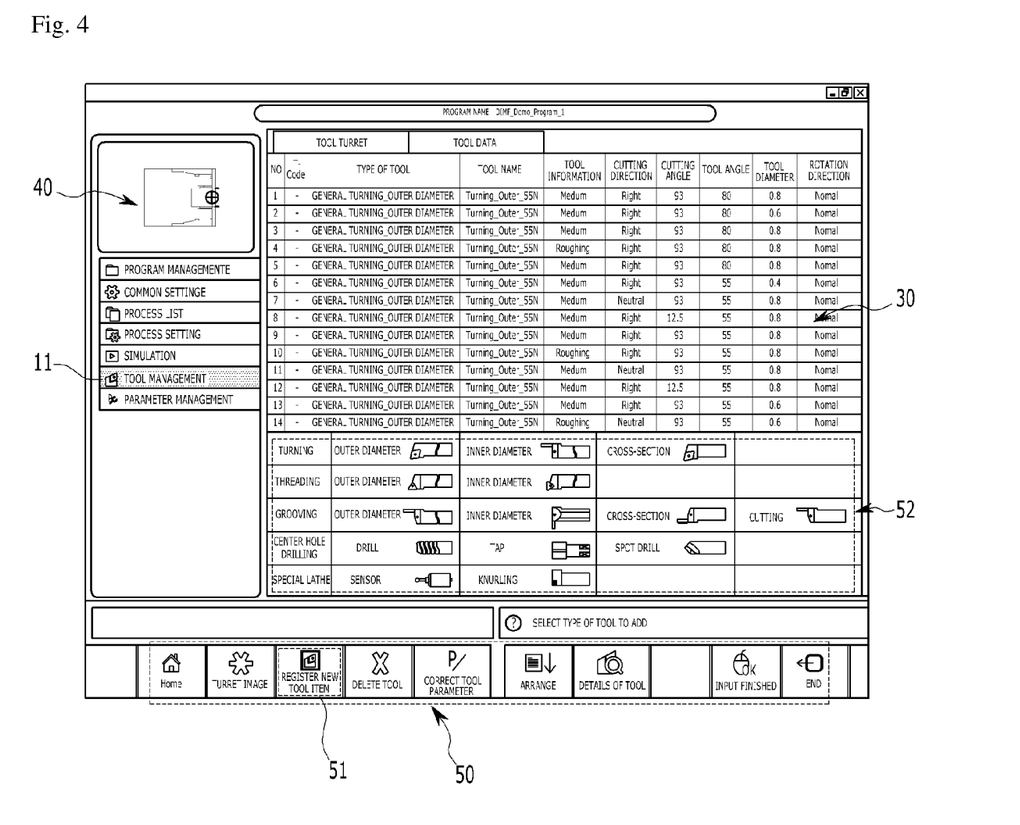

As illustrated in FIG. 4, the user can register or select a new tool. In detail, it is performed by selecting a specific function selection icon 51 from the function selection area 50. For example, the function selection icon 51 may be "register new tool item".

As described above, the function selection icon 51 for executing "register new tool item" is selected, the tool database 52 is shown up on a portion of the detail information area 30. It should be noted that the term "new tool" is an example and can be changed to "fresh tool" and the scope of the right is not limited by the terms.

Machining methods are arranged in the tool database 52 and the kind of the tool for the machining including characters, symbols, and images is outputted in each of the machining methods.

Accordingly, a user can easily select and add a desired tool even without learning complicated commands.

Figure 5:
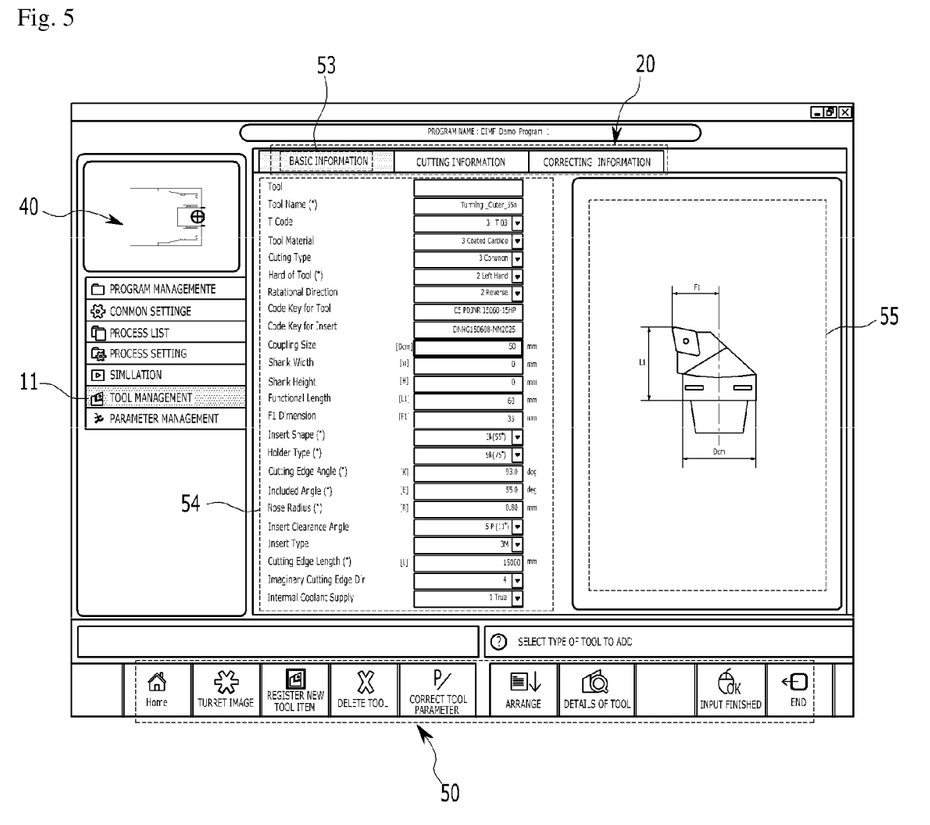

When a specific tool is selected, a window through which the features of the tool can be inputted is shown up, as illustrated in FIG. 5.

That is, as illustrated in FIG. 5, a first tool tab title 53 may be shown up in the sub-menu area 20. Cutting information and correcting information may be further displayed.

The first tool tab title 53 may be "basic information", and when the tab title of basic information is selected, a tool information area 54 and a basic tool image area 55 are outputted in the detail information area 30.

Detailed parameters of the tool can be inputted in the tool information area 54 and the shape of the selected tool is displayed by an image in the basic tool image area 55 to let a user know which position the value of the parameter that is being inputted is the value at.

Accordingly, even if not familiar with mechanical terminologies, a user can input accurate parameter values with reference to the displayed image.

Figure 6:
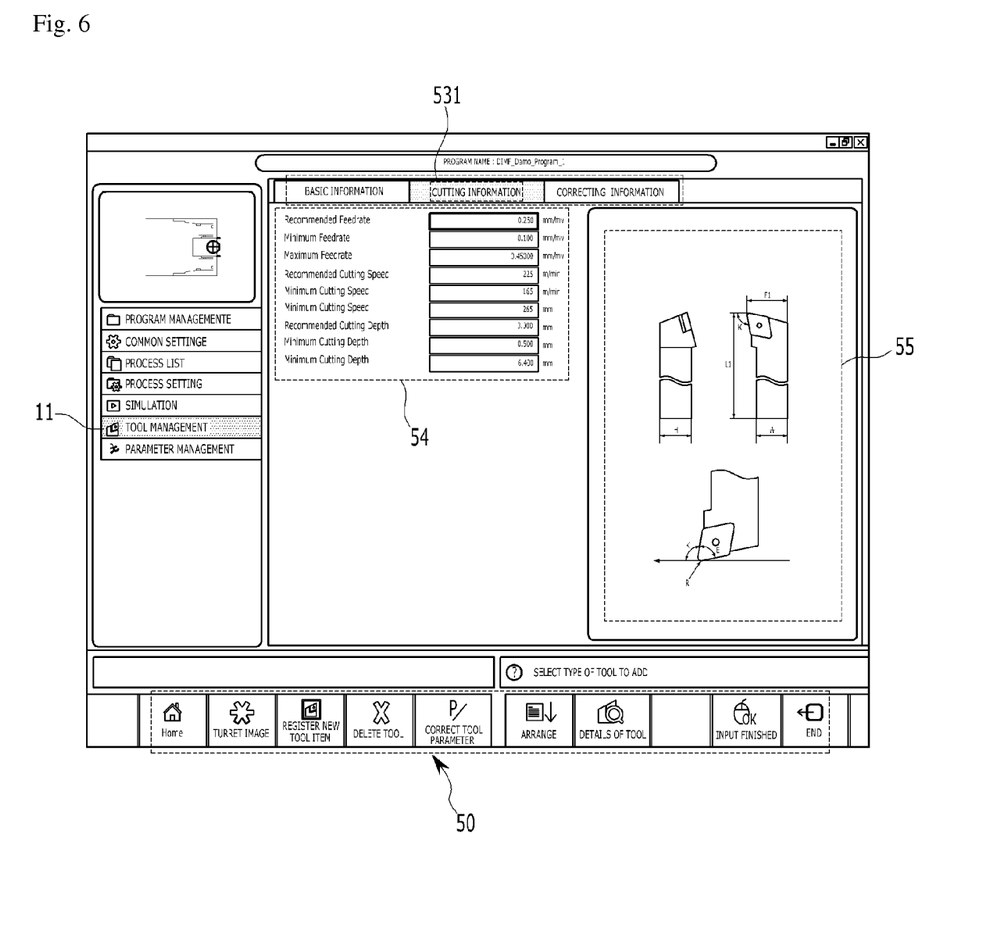

As illustrated in FIG. 6, a second tool tab title 531 may be selected from the sub-menu area 20 and the second tool tab title 531 may be "cutting information". For example, parameters such as a machining speed and the amount of cutting may be inputted in the cutting information.

As described above, the operational program according to the present disclosure makes it possible to add a new tool or manage previously registered tools by accumulating the information as a database.

In particular, the operational program of the present disclosure is operated as an interactive program, so it is convenient to add or delete a new tool and it is possible to select the most suitable tool from the accumulated database, when adding a new machining process or performing a specific machining process.

Figure 7:
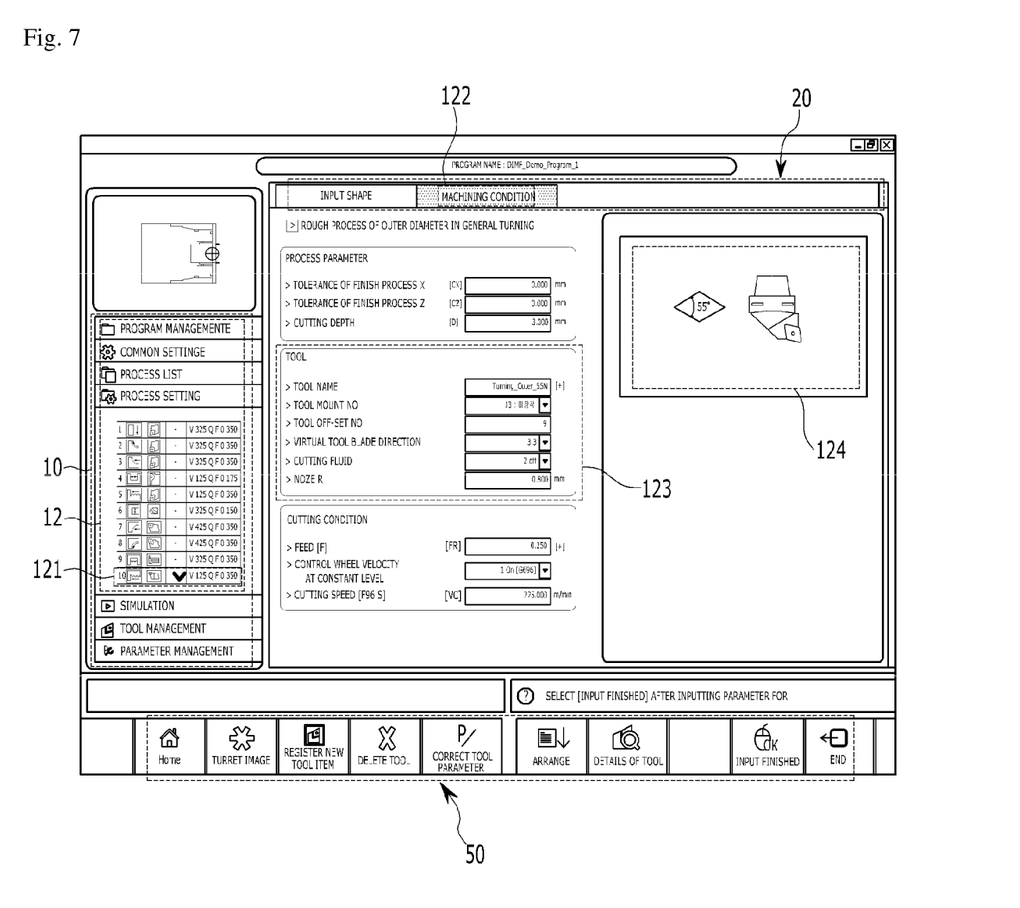

An example of performing the second function of the operational program and the tool selection method of a numerical control machine according to an exemplary embodiment of the present disclosure is described hereafter with reference to FIG. 7. The second function is an automatic tool recommendation function according to the shape and material of a workpiece and a process, using the tool database and an automatic cutting condition recommendation function according to the recommended tool information and the material of a workpiece, and a machining process.

As illustrated in FIG. 7, a process setting menu 12 is selected first from the main menu area 10. When the process setting menu 12 is selected, processes for specific machining are shown up. When a specific process record 121 in the processes is selected, a tool tab title 122 is shown up in the sub-menu area 20. The process tab title 122 may be, for example, "machining condition".

When the tool tab title 122 is selected, an area allowing input of a tool parameter value, a tool information presentation area 123, and an illustration area 124 are displayed in the detail information area 30.

When a detailed process parameter value is inputted, a tool suitable for the process is recommended and the specifications of the recommended tool are displayed by parameter values on the tool information presentation area 123. The image information of the tool is displayed on the illustration area 124.

Accordingly, when information of how to perform the machining process is inputted, a cutting tool suitable for the information is recommended.

In particular, the machining process can be outputted as an associated image on the illustration area 124, and for example, when turning is selected, a cylindrical material that is rotated is proposed and the information such as the rotational speed, the machining distance, and the diameter of the material can be displayed.

An algorithm of recommending a tool is described with reference to FIGS. 8 and 9.

Figure 8:
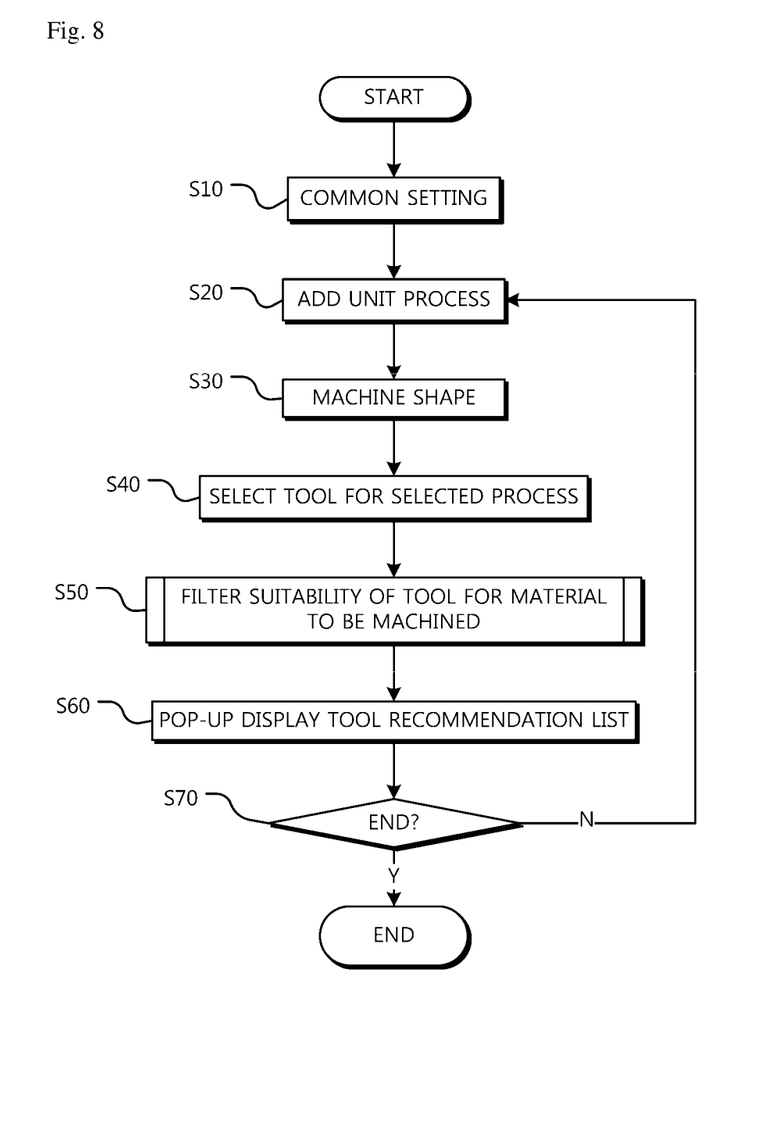
FIGS. 8 to 9 are flowcharts illustrating the operational program and the tool selection method of a numerical control machine according to an exemplary embodiment of the present disclosure.
Figure 9:
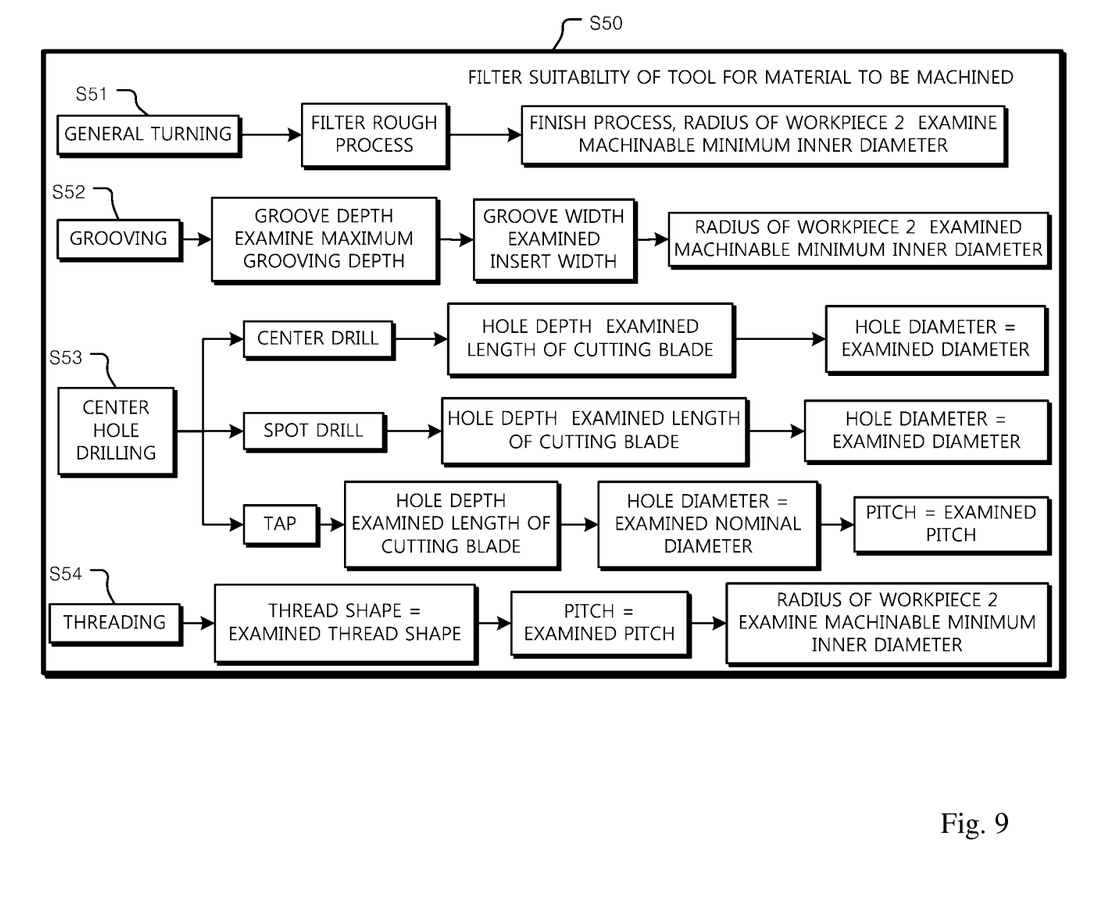
Figure 10:
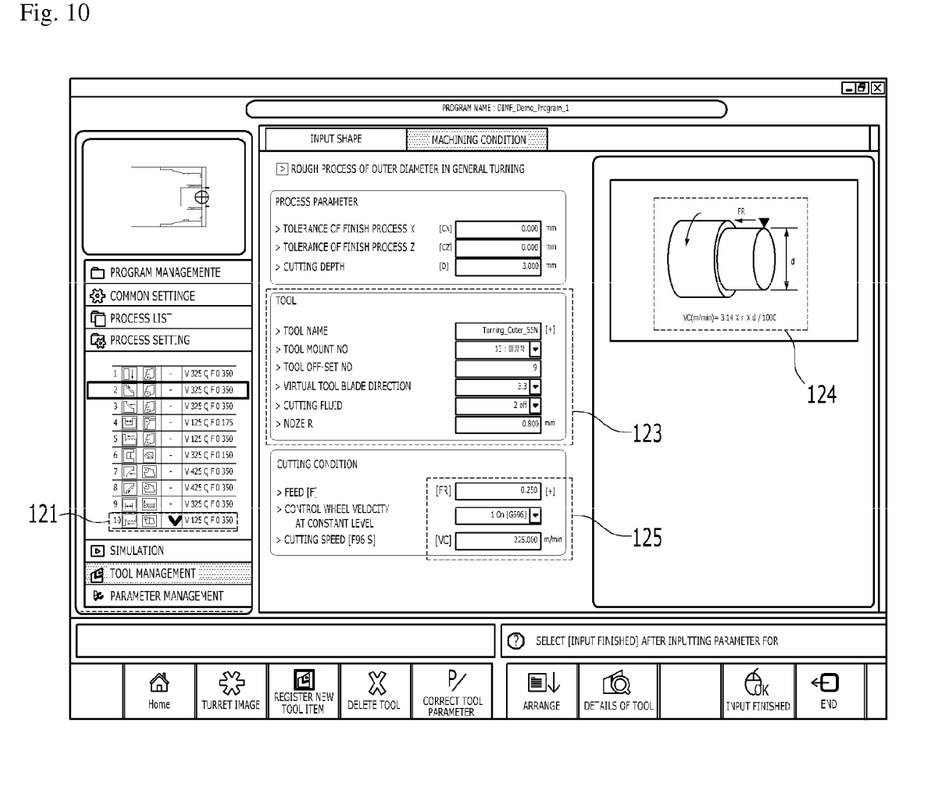
FIG. 10 is a diagram illustrating an example of recommending a tool by the operational program and the tool selection method of a numerical control machine according to an exemplary embodiment of the present disclosure.

Automatic tool recommendation and tool recommendation by the operational program and the tool selection method of a numerical control machine according to an exemplary embodiment of the present disclosure are described hereafter with reference to FIGS. 8 to 10.

FIGS. 8 to 9 are flowcharts illustrating the operational program and the tool selection method of a numerical control machine according to an exemplary embodiment of the present disclosure. FIG. 10 is a diagram illustrating an example of recommending a tool by the operational program and the tool selection method of a numerical control machine according to an exemplary embodiment of the present disclosure.

The process that the operational program according to an exemplary embodiment of the present disclosure recommends a tool is described by stages.

Common setting (S10): a step of receiving basic information. For example, information such as the quality and size of a material is inputted.

Adding unit process (S20): receiving a process for a machining. For example, whether it is general turning, grooving, center hole drilling, or threading is inputted. This step is a unit process selection step, when process design is made first, and it can be understood as a unit process adding step, when a new unit process is added during a process.

Machining shape (S30): receiving information on which shape to machine it in. Numerical information for specific machining can be inputted. For example, in general turning, one of inner diameter machining, outer diameter machining, or cross-section machining can be selected, and for the inner diameter machining, the information on the radius of a workpiece can be additionally inputted. In general turning, numerical information such as the depth and width of a groove and the radius of the workpiece can be inputted. In center hole drilling, numerical information such as the depth and diameter of a hole, pitch, the thread shape, and the radius of the workpiece can be inputted.

Selecting tool for selected process (S40): outputting tools suitable for the machining process inputted in adding unit process (S20) and selecting a specific tool by a user.

Examining suitability of tool for material to be machined (S50): a specific process for machining such as general turning, grooving, center hole drilling, or threading was selected in the adding of unit process (S20). Basic information of the material such as the quality and size of the material was inputted in the common setting (S10). Databases of tools suitable for the qualities of materials are stored in a memory or hardware of a machine tool and the tool suitable for the quality of the material inputted by a user is recommended in this step. It is possible to show the list of tools suitable for the selected process to the user, using the machining information inputted in the machining shape (S30) and the user can select the optimum tool from the list of tools. Alternatively, it may be possible to provide the user with the list of optimum tools by generally analyzing the machining information about the quality information and the machining shape of the material.

The lists of suitable tools are selected during "general turning", "grooving", "center hole drilling", and "threading", on the basis of the machining shape information.

This is described in detail with reference to FIG. 9.

In "general turning" (S51), when tools available for a rough process and a finish process are selected, a tool is selected for inner diameter process in the general machining by limiting the shape according to the tool shape and the inner diameter. The radius of the workpiece (material) is converted into a diameter and the machinable minimum inner diameter is examined. In "grooving" (S52), a tool is selected in accordance with the groove depth and the shape of the width, and a tool is selected for an inner diameter process of a groove by limiting the shape according to the tool shape and the inner diameter.

In "center hole drilling (S53), a tool is selected in accordance with the depth and diameter of a hole. In tapping, the pitch information is also included in the standards of choosing tools.

In "threading" (S54), a tool is selected in accordance with the shape and pitch of bolts described on the machining drawing, and a tool is selected for an inner diameter process of a bolt by limiting the shape according to the tool shape and the inner diameter.

If the examination fails in the process of examination described above, errors are displayed to let the user know the errors, thereby inducing the user to change the related parameter values.

Displaying tool recommendation list (S60): displaying a corresponding tool list and receiving user's selection, when one or a plurality of tools are examined as being suitable in the examining of suitability of tools for the material to be machined.

When selection of a tool is done, as illustrated in FIG. 10, the optimum cutting conditions are recommended on the basis of the information on the process, tool, and material. The user can correct the cutting conditions in accordance with the working environment and the condition of the machine, and the corrected cutting conditions are stored in the tool database and the stored values are displayed when similar work is performed later.

Additionally checking process (S70): a step of checking whether to add a process in the program made to machine a material. The process returns to the adding of unit process (S20) in order to add a new process. It is ended, when a new process is not added.

As described above, when a user adds a new process, using an interactive program, while managing the tool database, it is possible to automatically recommend the most suitable tool for the corresponding process in the system, using the tool database.

The operational program and tool selection method of a numerical control machine according to the present disclosure having the configuration described above can efficiently manage tools, using the tool database and the system can recommend the optimum tool selection and cutting conditions, using the tool information on the basis of the management.

In particular, selection of a tool and cutting conditions is very important for efficient and accurate machining, so it is possible to accumulate the information on the whole tools in a database and systematically manage the information, for the selection.

A user can use the tool information in the accumulated tool database, such that it is possible to improve machining precision and efficiency and maximize convenience of use by automating tool selection and input of cutting conditions, which have depended on the user's experiences.

Accordingly, since the system provides optimum recommended values, a user who has insufficient expert knowledge and experiences can make selection of a tool and selection of cutting conditions, which have depended on the users' experiences, so the user can achieve good results.

The operational program and tool selection method of a numerical control machine according to the present disclosure can considerably contribute to increasing improving work efficiency and to reliability in machining in addition to convenience for a user.

The operational program and tool selection method of a numerical control machine according to the present disclosure may include a function capable of automatically creating an NC program on the basis of data inputted by an interactive program.

Although an exemplary embodiment of the present disclosure was described above with reference to the accompanying drawings, those skilled in the art would understand that the present disclosure may be implemented in various ways without changing the necessary features or the spirit of the present disclosure.

Therefore, it should be understood that the exemplary embodiment described above is not limitative, but only an example in all respects, the scope of the present disclosure is expressed by claims described below, not the detailed description, and it should be construed that all of changes and modifications achieved from the meanings and scope of claims and equivalent concept are included in the scope of the present disclosure.

The operational program and tool selection method of a numerical control machine according to the present disclosure are available for operating a numerical control machine by performing tool selection, correction setting, and tool management.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An operational program of a numerical control machine, comprising:
   a main menu area in which main menus including a tool management menu and a tool setting menu are arranged;
   a detail information area in which the list of tools mounted on a machine tool is outputted, when the tool management menu is selected from the main menu area;
   a preview area that displaying the machining state of a material on the basis of the information inputted through the main menu area; and
   a function selection area in which a function selection icons are arranged to perform an additional function,
   wherein when the tool management menu is selected from the main menu area, a icon for registering a new tool is shown up on the function selection area, and
   the icon for registering a new tool is selected, a tool database including characters, symbols, and images for tool lists is outputted in the detail information area in accordance with a machining method so that a new tool can be registered.

2. The operational program of claim 1, wherein when a specific tool is selected from the tool database, a tool information area and a basic tool image area are outputted in the detail information area, parameter values of the tool are inputted from the tool information area, and an image of the tool is displayed in the basic tool image area.

3. The operational system of claim 2, wherein when a specific tool is selected from the tool database, a tool information area and a basic tool image area are outputted in the detail information area, cutting information on the tool to be newly registered is inputted in the tool information area, and an image of the tool is displayed in the basic tool image area.

4. The operational system of claim 1, wherein when a specific tool is selected from the tool database, a tool information area and a basic tool image area are outputted in the detail information area, cutting information on the tool to be newly registered is inputted in the tool information area, and an image of the tool is displayed in the basic tool image area.

5. The operational program of claim 1, wherein when the tool setting menu is selected from the main menu area, an area where process parameter values can be inputted, a tool information presentation area, and an illustration area are displayed in the detail information area, and
   when the process parameter values are inputted, a tool suitable for the values is recommended in the tool information presentation area and the image of the tool is outputted in the illustration area.

6. The operational program of claim 5, wherein when a plurality of tools is to be recommended, the list of tools is outputted and a desired tool is selected.

7. The operational program of claim 5, wherein when the process parameter values are inputted, a machining process suitable for the illustration area is outputted as an associated image.

8. A tool selection method of a numerical control machine, comprising:
   receiving basic information such as the quality of a material to be machined;
   selecting a process for machining;
   receiving the shape to be machined and numerical information;
   displaying a tool suitable for the selected process and receiving a specific tool selected by a user;
   examining suitability of the tool for the material to be machined;
   receiving a machining method of any one of general turning, grooving, center hole drilling, and threading selected by a user; and
   displaying a tool suitable for the machining method selected by a user, using the shape to be machined and the numerical information.

9. The method of claim 8, wherein when a machining for the general turning is selected, a tool that does not interfere with inner diameter machining in inner diameter machining is recommended, and when it is not inner diameter machining, tools suitable for a rough process and a finish process are sequentially shown to a user.

10. The method of claim 8, wherein suitability of a tool for the material to be machined is examined by filtering tools suitable for the material to be used and showing the tools to a user on the basis of recommended tool information according to the quality of a material to be machined, which is stored in a memory of a machine tool.

11. The method of claim 8, wherein the displaying of a tool suitable for grooving includes displaying a tool suitable for the grooving method on the basis of any one selected from the information on a groove depth, a groove width, and the radius of a workpiece inputted by a user in the machining of shape.

12. The method of claim 8, wherein the displaying of a tool suitable for center hole drilling includes displaying a tool suitable for the center hole drilling method on the basis of any one selected from the information on a hole depth, a hole diameter, a hole depth, a pitch, a threaded shape, and the radius of a workpiece inputted by a user in the machining of shape.

* * * * *

UNITED STATES PATENT AND TRADEMARK OFFICE
CERTIFICATE OF CORRECTION

PATENT NO. : 9,195,366 B2  
APPLICATION NO. : 14/139097  
DATED : November 24, 2015  
INVENTOR(S) : Kim et al.

Page 1 of 1

It is certified that error appears in the above-identified patent and that said Letters Patent is hereby corrected as shown below:

In the claims

Claim 1 Column 9, line 7, delete "which a function" and insert --which function--.

Claim 12 Column 10, lines 62, delete "a hole depth".

Signed and Sealed this
Second Day of August, 2016

Michelle K. Lee
*Director of the United States Patent and Trademark Office*